(12) United States Patent
Kotarinos (10) Patent No.: US 11,816,592 B2
(45) Date of Patent: Nov. 14, 2023

(54) DIGITAL DEMOCRACY BENEFICIARY MANAGEMENT SYSTEM USING BAYESIAN STATISTICS, MACHINE LEARNING AND VOTING LOGIC

(71) Applicant: Michael William Kotarinos, Palm Harbor, FL (US)

(72) Inventor: Michael William Kotarinos, Palm Harbor, FL (US)

(73) Assignee: Oxyml LLC, Palm Harbor, FL (US)

( * ) Notice: Subject to any disclaimer, the term of this patent is extended or adjusted under 35 U.S.C. 154(b) by 431 days.

(21) Appl. No.: 16/824,998

(22) Filed: Mar. 20, 2020

(65) Prior Publication Data

US 2021/0295190 A1    Sep. 23, 2021

(51) Int. Cl.
*G06N 7/01* (2023.01)
*G06N 20/00* (2019.01)

(52) U.S. Cl.
CPC ............ *G06N 7/01* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 7,882,522 B2 | 2/2011 | Neufeld et al. | |
| 8,458,715 B1 * | 6/2013 | Khosla | G06F 9/50 718/104 |
| 9,569,655 B2 | 2/2017 | Harper | |
| 10,146,766 B2 | 12/2018 | MacMillan et al. | |
| 10,275,418 B2 | 4/2019 | Aleskerov et al. | |
| 10,296,512 B1 | 5/2019 | Chandran et al. | |
| 2020/0005395 A1 * | 1/2020 | Abdollahian | G06Q 40/06 |

OTHER PUBLICATIONS

Komorowski, Matthieu & Jesse Raffa, "Markov Models and Cost Effectiveness Analysis: Applications in Medical Research", Chapter 24 appearing in Secondary Analysis of Electronic Health Records, Springer, pp. 351-367. (Year: 2016).*
Zahid, Manzoor Ahmad and Harrie De Swart. The borda majority count. Information Sciences 295 (2015): 429-440.
(Continued)

*Primary Examiner* — Scott A. Waldron
(74) *Attorney, Agent, or Firm* — VITALE, VICKREY, NIRO, SOLON & GASEY LLP (57) ABSTRACT

In the disclosure of the present innovation the system utilizes artificial intelligence, machine learning, and data analytics for practical and robust digital democracy applications to dynamically predict the most important states to survey in a process. In the present invention, beneficiaries are surveyed about their preferences over various options in these surveyed states. In the current invention, when a state that has not been surveyed occurs, Bayesian methods are used to dynamically predict what a user's ballot would have looked like if that state had been surveyed and Bayesian prediction is then tested, and if the result is found to be robust then a decision is reached using voting logic and economic theory. In the system of the current invention, if the results are not robust, then the process is rerun to determine the most important states to survey.

6 Claims, 5 Drawing Sheets

(56) References Cited

OTHER PUBLICATIONS

McComb, Christopher, Kosa Goucher-Lambert, and Jonathan Cagan. "Impossible by design? Fariness, strategy, and Arrow's impossibiity theorem." Design Science 3 (2017).
Boshkoska, Meri. "The Agency problem: Measures for its overcoming." International Journal of Business and Management 10.1 (2015): 204.
Greiner, Adam, Mark J. Kohlbeck, and Thomas J. Smith. "The relationship between aggressiv real earnings management and current and future audit fees." (2016).
Jorge Lopez, Martin Krzywinski, and Naomi Altman. "Points of significance: Bayes' theorem." (2015): 277.
Koop, Gary. "Bayesian methods for empirical macroeconomics with big data." Review of Economic Analysis 9.1 (2017): 33-56.
Zeng, Eric, et al "When Econometrics Meets Machine Learning." Data and Information Management 1.2 (2017): 75-83.

\* cited by examiner

Transition Probability Overview

Digital Election Example: Polled Election for State 1

DIGITAL DEMOCRACY BENEFICIARY MANAGEMENT SYSTEM USING BAYESIAN STATISTICS, MACHINE LEARNING AND VOTING LOGIC

FIELD OF THE INVENTION

The present invention is directed generally to Bayesian statistics and Voting Logic to develop a digitized weighted beneficiary management system under uncertainty.

BACKGROUND OF THE INVENTION

The present invention operates to identify the current state of a system by parsing the information with artificial intelligence ("AI"), machine learning and data analytics. The system ranks the information and then dynamically predicts the most important states to survey in the process. Beneficiaries are surveyed and provide data regarding preferences for various options relating to the various states. When one of the states that is surveyed occurs, the voting logic and economic theory is used to make decisions and supply data on the course of action that most closely conforms with the preferences of the beneficiaries. The present invention operates to predict what a ballot would prefer when a state has not been surveyed.

The system dynamically predicts new scenarios which may occur using a Bayesian technique and tests the robustness of the Bayesian predictions. The probability of transforming from one state to another may be estimated and the estimates of many states may be summarized together as a Markov chain. The Markov chains can be built to test for robustness. The system uses data analytics and machine learning to determine the most important transition states.

One long-standing issue that has existed is how to make a decision with multiple participants when each participant has different expectations. One of the most critical and earliest works in this area is described in Arrow's Impossibility Theorem, which showed that any decision-making system has to violate at least one "fairness" condition and as such there is no universally optimal voting or decision making system McComb, Christopher, Kosa Goucher-Lambert, and Jonathan Cagan. "*Impossible by design? Fairness, strategy, and Arrow's impossibility theorem.*" Design Science 3 (2017). Since Arrow's work, there have been numerous proposals on how to address voting issues and ways to establish decision-making systems. None of those proposals, however, incorporates the techniques of the current invention, namely using AI, machine learning and data analytics to rank information and dynamically predict new scenarios. Likewise, the prior art does not disclose the use of a system implementing Bayesian techniques to test the robustness of the scenarios.

DESCRIPTION OF THE RELATED ART

One of the most commonly used methods to handle the decision making process is the Borda count. Zahid, Manzoor Ahmad, and Harrie De Swart. "*The border majority count.*" Information Sciences 295 (2015): 429-440. The Borda count is favored for its simplicity, ease of use, and relative robustness. The Borda count will produce similar and consistent results even with rather significant deviations from the assumptions underlying the model and with some deviations in voter preferences. This robustness makes it an appealing candidate for use in a voting system. However, it does not have the benefits of the current invention of using data analytics and machine learning to determine selected transition states.

In many cases, it is necessary to be responsible for another individual as a fiduciary and represent his or her interests. Verifying that one's actions to represent the desires of the beneficiary can often be difficult and becomes even more difficult with multiple beneficiaries. Mismatches between a representative with a fiduciary responsibility to a beneficiary and the beneficiary are encapsulated in the agency problem, which is a common issue not just in economic theory but in corporate governance, politics, organizational psychology and many fields. Boshkoska, Meri. "*The agency problem: Measures for its overcoming.*" International Journal of Business and Management 10.1 (2015): 204. As such, there is demand for tools to address the problem of mismatches.

It is not possible to request the preferences of individuals in real-time across every possible issue that may arise. For example, markets may change very rapidly, and it may not be possible to contact beneficiaries in real time, or it may not be feasible to contact a beneficiary every time markets change. Managing and balancing the needs of clients with feasible operations is a challenging endeavor requiring empirical research. Greiner, Adam, Mark J. Kohlbeck, and Thomas J. Smith. "*The relationship between aggressive real earnings management and current and future audit fees.*" Auditing: A Journal of Practice &Theory 36.1 (2016): 85-107. Much of the work on the issue of asking preferences of individuals in real-time. The proposed invention's digital real-time surveying innovation represents a significant improvement over the prior art systems. Because it is able to predict a desired state based upon the beneficiaries' preferences regarding other states.

New techniques to dynamically predict and understand people's preferences are enabled by new applications of machine learning, Bayesian techniques and AI. Bayesian techniques have a long history of application and represent a new take on statistics that varies from the traditional techniques that have been advocated by Jorge Lopez, Martin Krzywinski, and Naomi Altman. "*Points of significance: Bayes' theorem.*" (2015): 277. In Bayesian approaches the parameters of interest are allowed to vary over time and are not fixed and are also thought of as being subjective. Subjective probabilities are an important innovation but have seen limited use in modern traditional econometrics. Koop, Gary. "*Bayesian methods for empirical macroeconomics with big data.*" Review of Economic Analysis 9.1 (2017): 33-56. These techniques were popular for some time in data science, but recently have taken a backseat to machine learning based approaches. The Bayesian methods have not been applied to voting theory. The current invention applies new use for Bayesian philosophy by incorporating the ideas underlying the Bayesian philosophy into a new framework based on voting theory, machine learning and artificial intelligence. The intersection of machine learning and econometrics is also quite new, and is still developing as a new area of econometric theory and practice. Zheng, Eric, et al. "*When Econometrics Meets Machine Learning.*" Data and Information Management 1.2 (2017): 75-83. The current invention incorporates machine learning into a voting-based system that represents an innovative expansion of Bayesian methods in voting theory.

U.S. Pat. No. 10,275,418 addresses the use of Borda counts and Pareto frontiers in a search and optimization process. The current invention is not a Borda-based search process but rather a digitized democracy system that aims to dynamically compact information to predict voter preferences in states that have not been surveyed. That is not done in a Borda count system.

U.S. Pat. No. 7,882,522 focuses on predictions of new user preferences based on old information, but this technique primarily focuses on programming. In the current innovation there is no electronic programming guide or digital content delivery. Instead, the current invention is based on dynamically predicting preferences of multiple users using digital voting systems, rather than viewing preferences of an individual user. Additionally, U.S. Pat. No. 8,006,259 also focuses on real-time technology for enhancing the user experience of content viewers. This is yet again different in scope and application than the current innovation.

U.S. Pat. No. 10,296,512 addresses composite scoring systems for content delivery systems. However, the present invention focuses on content delivery and action-based content scoring and combining multiple different content scoring systems together. The proposed innovation is not a content delivery recommendation system, but rather a system to ensure compliance with fiduciary responsibilities and to manage agency problems, and discrepancies in preferences of different beneficiaries by utilizing dynamic predictions of preferences using Bayesian techniques to formulate a desired preference.

U.S. Pat. No. 10,146,766 addresses measuring user behavior to dynamically make suggestions for use in email systems. This differs from the current innovation. The proposed invention is not designed for specific use in email marketing systems and dose not make dynamic suggestions. Rather, the current invention dynamically predicts aggregate preferences of multi-beneficiary systems. The current invention differs from the '766 patent in terms of practicality of application, end goals and procedures for implementation and use from the proposed innovation.

U.S. Pat. No. 9,569,655 addresses using machine learning to dynamically predict digital livescan fingerprints. This is focused on forensic applications in fingerprint predictions using techniques from machine learning and uses voting logic. However, the proposed innovation incorporates techniques from artificial intelligence theory and machine learning and extends beyond use in fingerprint detection to the management of agency issues and client relations.

SUMMARY OF THE INVENTION

There is a need for trusts and government agencies to make decisions in the best interests of those they are entrusted to represent. For example, a trust may have to choose how to manage a portfolio with many different beneficiaries at different stages of life with different investment goals. Because of this, the manager of the trust will try to understand the desires of the trust beneficiaries to make decisions in the best interests of the trust.

New information will often arise in real-time, and as such there is a need to incorporate this information, update beliefs and make a new decision. For example, market conditions could change, and a trust may need to change asset positions. Sometimes these changes can occur very rapidly. For example, a market correction could create a buying opportunity that is only open for a couple of hours and in some cases only seconds. As such, there may not be time to reach out to the beneficiaries and get feedback and gauge their opinion on every matter. It is often not feasible or practical to reach out to beneficiaries and recipients all the time. For this reason, trusts and other organizations with fiduciary responsibilities are given a great deal of discretion in the decision-making process.

Even though managers have a great deal of discretionary authority, there is still a desire to know how the beneficiaries would likely react and what their preferences would be. One solution to this and the basis for this invention is a system that uses statistical methods, machine learning, Bayesian statistics, and voting theory to create a digital democratized voter system to make suggestions that mimic a real voter. While this system may resemble a voting simulation, it incorporates real-data into the decision-making process.

The proposed invention uses a multi-stage process that combines statistical and Bayesian techniques with machine learning and voting theory to create a digitized democracy voter system. The steps in the analytical process in the proposed invention are:

1. Identify the current state of a system of interest.
2. Use machine learning, statistics, and/or data analytics to determine the most likely future possible states of the system of interest.
3. Preventing an inquiry to the beneficiaries regarding preferences for alternative options in the current state and further presenting an inquiry regarding preferences over the most important and most likely speculative outcomes in the future, as determined in step 2.
4. Use the results from step 3 to rank what decisions to make in the current state and speculative states. Reach a conclusion.
5. If a state arises that is different from those covered in step 4, use Bayesian techniques to predict the preferences of beneficiaries based on available data.
6. Test the robustness of results in step 5.
7. If the results no longer appear robust, return to step 1 and repeat the process. If the result is robust, draw a conclusion.

DESCRIPTION OF THE DRAWINGS

Certain embodiments are disclosed with reference to the following drawings.

DETAILED DESCRIPTION OF THE PREFERRED EMBODIMENTS

Figure 1:
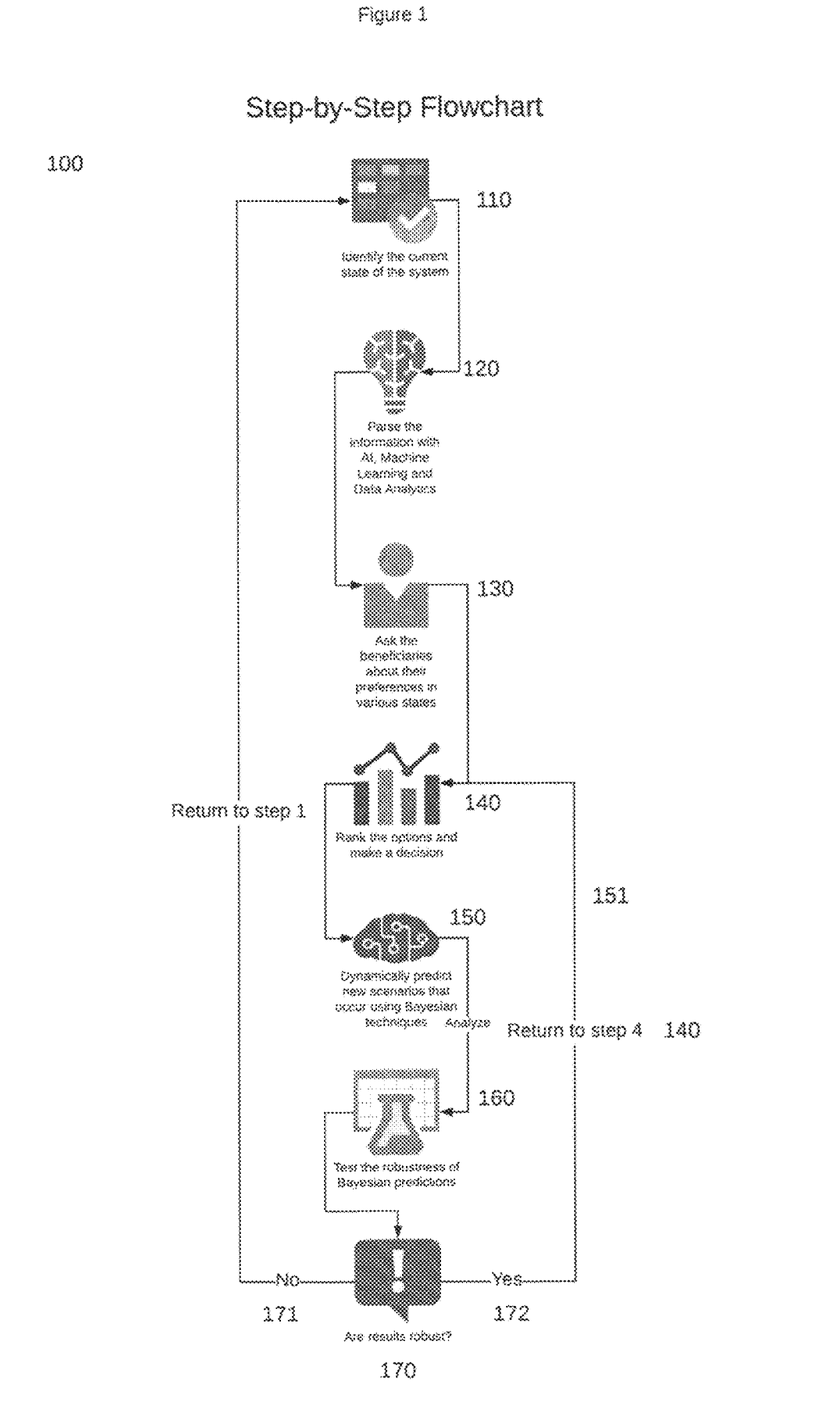
FIG. 1 is a flow diagram of an exemplary system that may be used to implement a predictive result based upon the critical states to poll or analyze.

One embodiment of the present invention is depicted in FIG. 1. FIG. 1 depicts a step-by-step flowchart of the steps of the current invention. The computer 100 based-platform utilizes statistics and logic to develop a digitized weighted beneficiary management system. First, the current state 110 of a system of interest is identified. The information is then parsed using a combination of machine learning, artificial intelligence, and data analytics 120. This process allows the computer based platform to determine the most important states to poll in the process. The selected states to poll are typically states that are highly likely to occur or states that are significantly different from other states. In a financial setting, for example, it may be most beneficial to choose to poll beneficiaries in states of low growth, medium growth, high growth, or recession. Beneficiaries are polled 130 regarding their preferences in the various states. Using the data obtained from the polling of the beneficiaries 130, the possible options are ranked 140, and the platform operates to develop a conclusion. Examples of this polling and decision making are shown in later figures. If a scenario is reached that is different from a polled state 110, then Bayesian methods 150 may be implemented to predict the desired state preferred by beneficiaries. The platforms decision process dynamically generates new predictions 151 that occur using Bayesian techniques 152. The robustness of the chosen prediction 151 (based on the ranked options 140) are tested 160 to see how sensitive the conclusion is to deviations in assumptions and choices. The test step 160 runs tests to analyze the robustness of the Bayesian predictions 151. The results of the test step 160 are measured against a standard 170 to determine if the results of Bayesian predictions 151 are robust. If the test determines the Bayesian prediction 151 is not robust 171, the process reverts back to step 110. The new state of the process is the current state, and from the current state the process determines the most important states to poll that have not yet been surveyed. If the results are determined to be robust 172, then the decision from step 140 can be reaffirmed, and the process returns to step 140 where it stays dormant until the system reaches a state that has not been polled, at which time the system transitions into step 150 that dynamically predicts new scenarios that may occur.

Figure 2A:
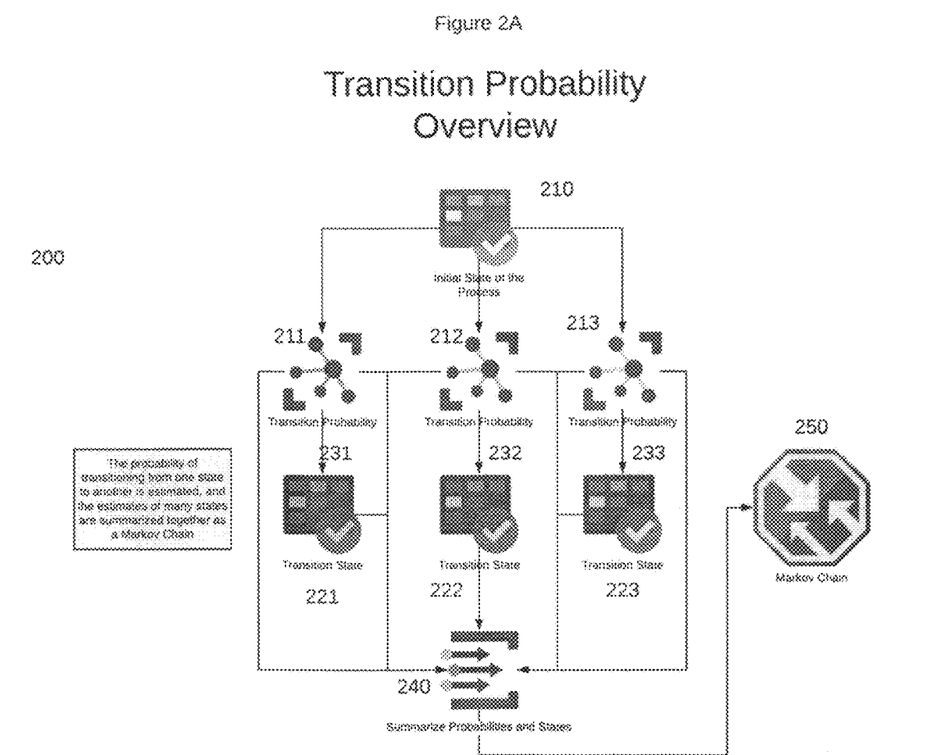
FIG. 2A is a flow diagram of an exemplary system that depicts the probability of transitioning from one state to another and the estimates of the states are summarized together as a Markov Chain.

Turning to the FIG. 2A flow chart provides an overview 200 of how transition probabilities are calculated and used in the present invention. Once the initial state of the process 210 is determined, then data analytics and machine learning are used to estimate the probabilities associated with the process transitioning into various states. The transition probability 211, 212 and 213 are based on an analysis of a transition state 221, 222 and 223 and the probability that the state will transition 231, 232 and 233 from one state to another. The estimates transition probabilities 211, 212 and 213 of the various transition states 221, 222 and 223 are summarized in probabilities and states 240. The summarized probabilities and states 240 may be presented in a Markov Chain 250. For example, if the process is a financial market the transition probabilities of interest could be transitioning into a recession or a growth cycle. These transition probabilities are dependent on the state of the system. For example, a recession can stay as a recession, and may have a different probability than a growth cycle turning into a recession. The different probabilities 240 are then combined into what is known as a Markov Chain 250. A Markov Chain 250 is a representation of the entire process as a large matrix of states that gives the probability of moving from one state to another.

Figure 2B:
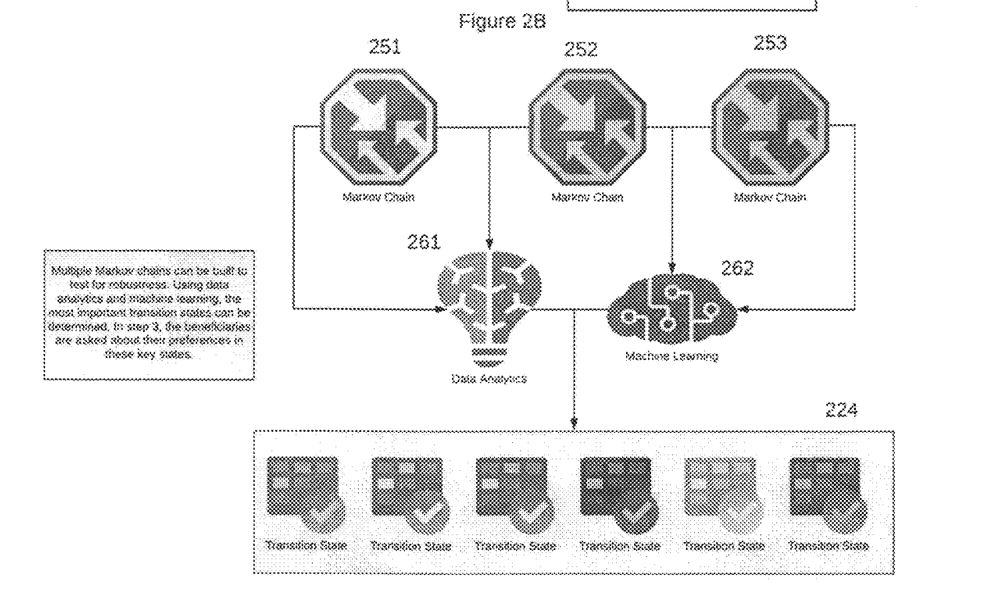
FIG. 2B is a flow diagram of an exemplary system relating to multiple Markov Chains can be built to test for robustness by using machine learning and data analytics to determine the most important transition states.

As shown in FIG. 2B, the process of FIG. 2A can be repeated with different assumptions and beliefs to generate different transition probabilities and transition states, and the result would be multiple Markov Chains 251, 252, 253. In our example, the likelihood of transitioning into a recession could be made more likely or less likely resulting in different chains. Using data analytics 261 and machine learning step 262, the different probability chains or Markov Chains 251, 252 and 253 may be analyzed to determine which transition states 224 appear to be the highest priority to poll. Once these transition states 224 are determined, the transition states 224 determined the most vital are then polled, and the participants express their preferences through a ballot ranking the options in these states 224 to determine the most preferred states 301, 302 and 303.

Figure 3:
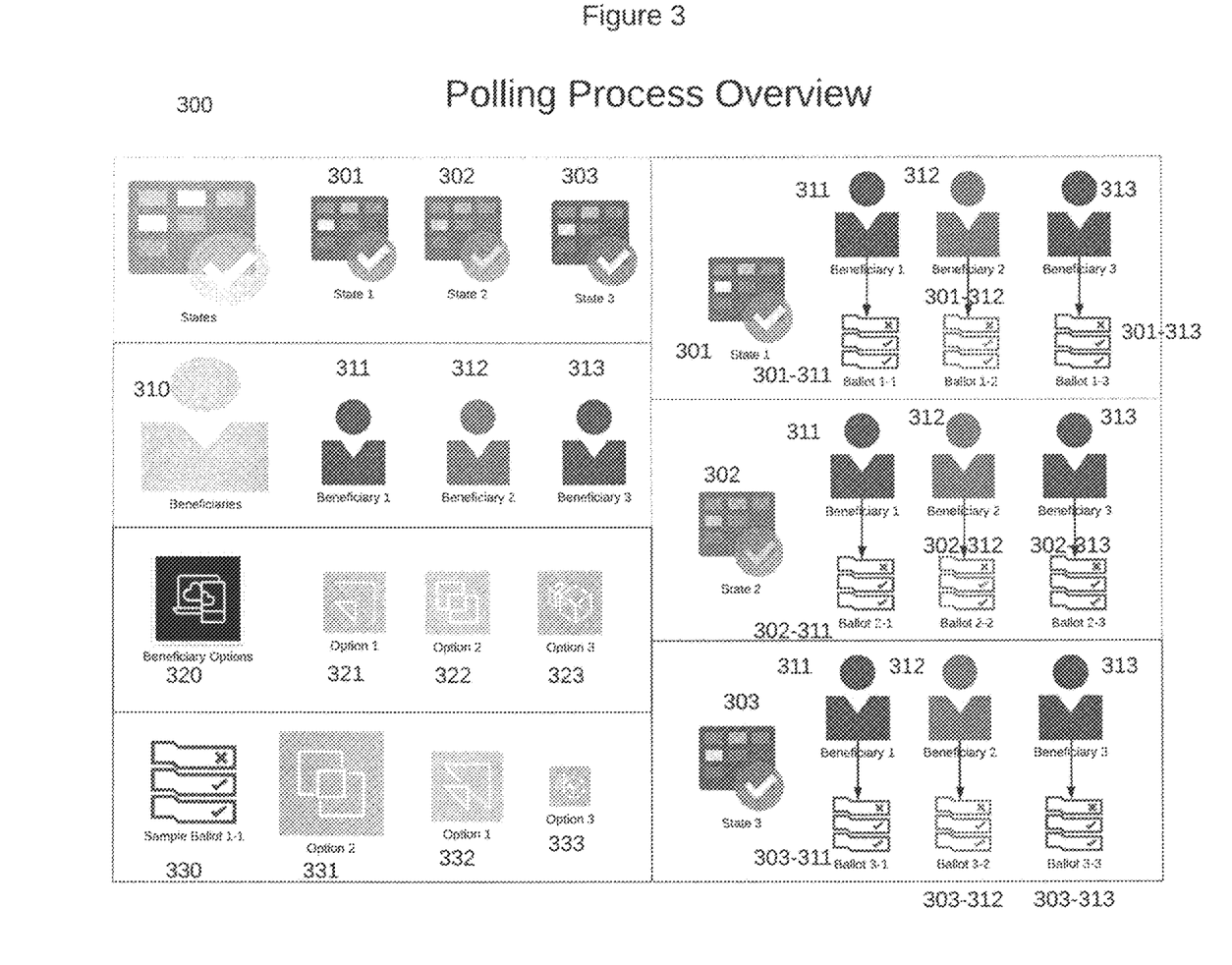
FIG. 3 is a flow diagram of a polling process overview of the present invention.
Figure 4:
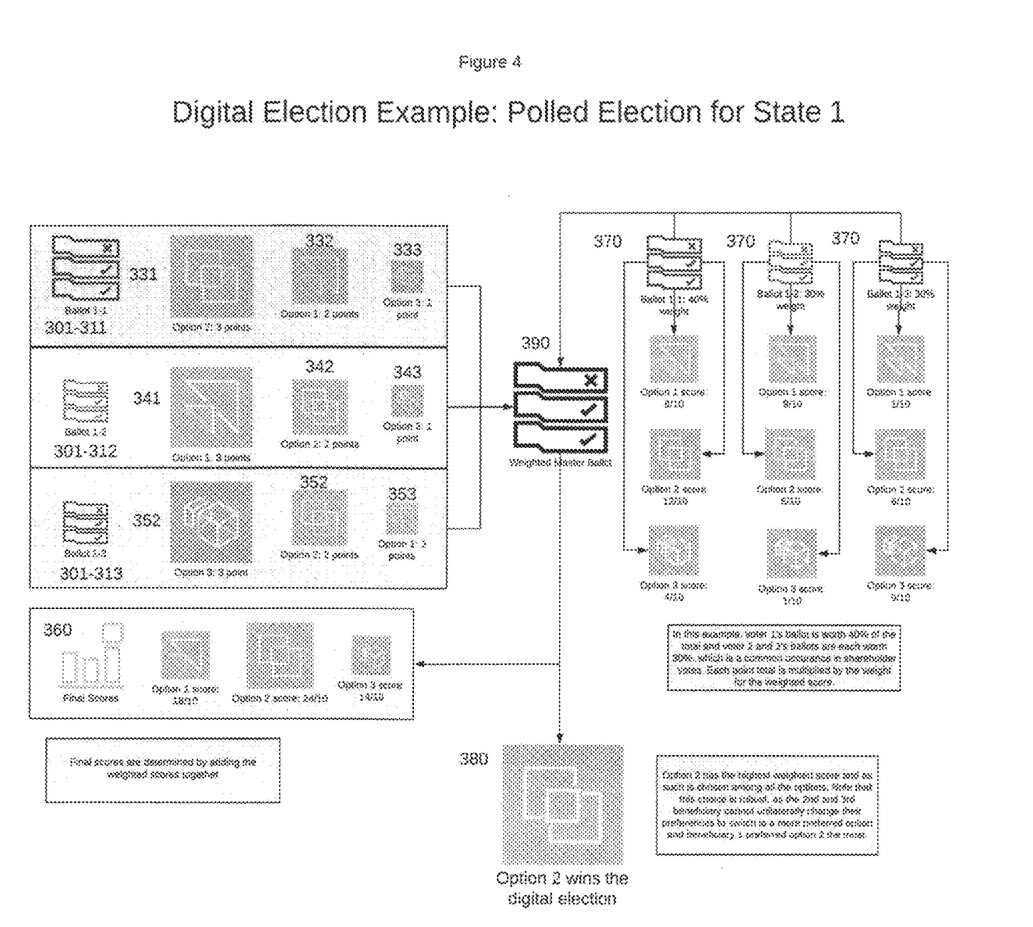
FIG. 4 is an exemplary system to determine the highest weighted score and the final score.
Figure 5:
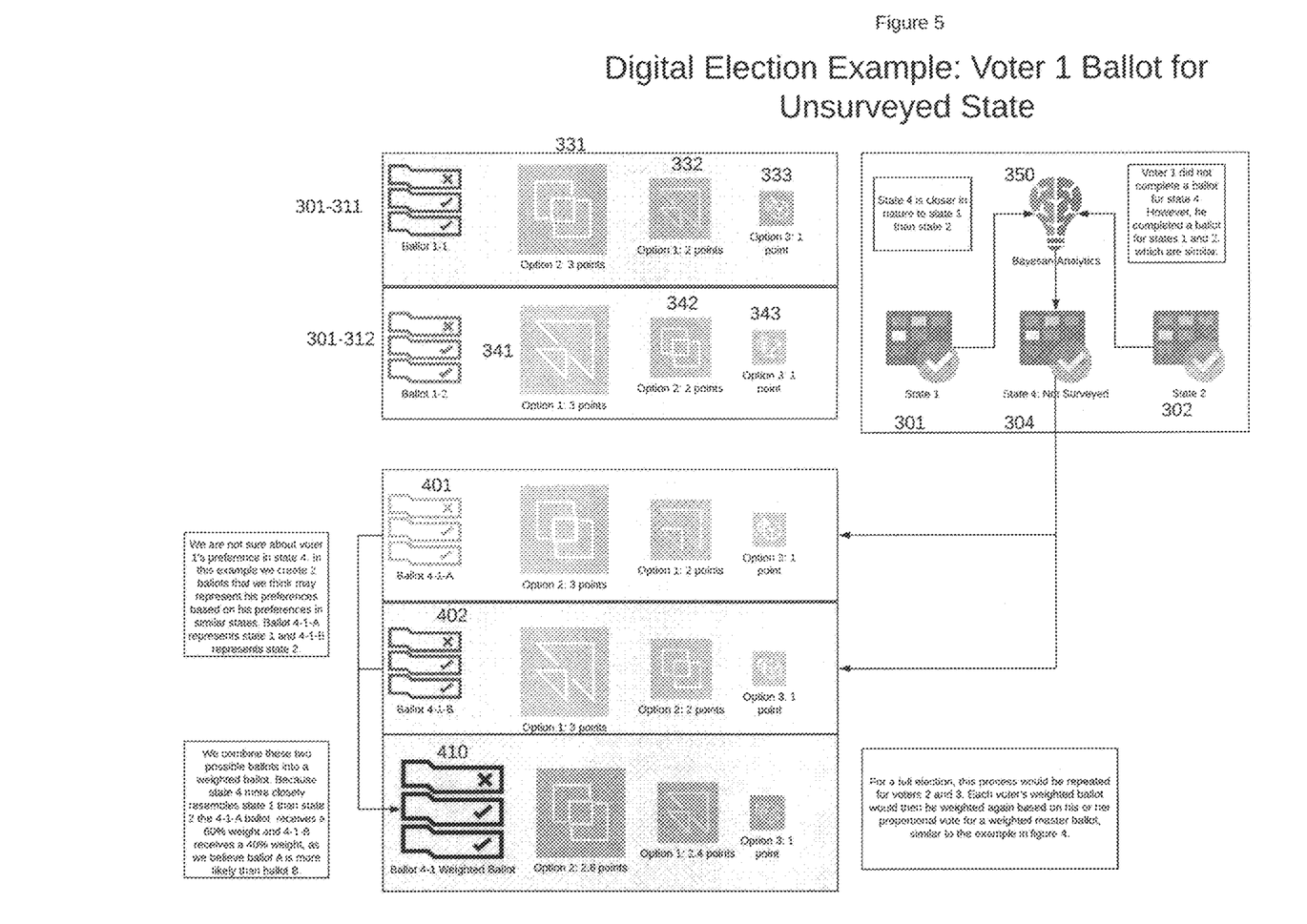
FIG. 5 is an exemplary system for the election for a state that has not been surveyed.

FIG. 3 provides an example overview of some concepts and ideas that form the basis for the examples in FIGS. 4 and 5. In FIG. 3, the example depicts that there are three states 300 that have been polled, as denoted by states 301, 302 and 303. The system in the example of FIG. 3 has three beneficiaries 310, but any number of beneficiaries may be implemented. Beneficiary one 311 is weighted to have 40% of the total vote, and beneficiaries two 312 and three 313 each have 30% of the total vote. That is to say, beneficiary one is weighted one third more than each other individual beneficiary. The beneficiaries 310 have available options 320 which may comprise by way of example, option 321, option 322 and option 323. Each beneficiary 310 may consider three different options, called options 321, 322 and 232. In each state each beneficiary is polled and has a ballot. The ballot 330 may present various options 331, 332 and 333. Each ballot may have a number 330 assigned to it. The first number denotes the state 300, and the second denotes the beneficiary 310. For example, ballot 303-311 represents the preferences of the first beneficiary 311 in the third state 303. With three different states and three different beneficiaries, this represents a total of 9 different ballots in the example. A sample ballot 330 is shown for state 1-1. In the sample ballot, the larger image size for option 2 is meant to show that it is the most preferred option, the smaller size for option 1 shows that it is the second most preferred option and the small image for option 3 shows that it is the least preferred option.

FIG. 4 shows an example of a digital election process for state 1 (301). In FIG. 3 it was shown that state 1 (301) was one of the states where beneficiaries 310 were polled, and as such in this example the invention polls ballots 330 from the beneficiaries 310. In this example, a simple Borda count was used to score each ballot 330. In a Borda count, each participant ranks his or her preferences among all the available options. For n options, the most preferred option on a ballot 330 receives n points, the second most preferred receives n−1 points, and so on with the least preferred option receiving 1 point. In this example there are three options, so the most preferred option 331, 341 and 351 on each ballot will receive three points, the second most preferred option 332, 342 and 352 will receive two points and the least preferred option 333, 343 and 353 will receive one point. In a normal Borda count with each participant being equal we would simply sum up all the ballots. However, in the current invention, the ballots 301-311, 301-312 and 301-313 are weighted based on the relative importance of each beneficiary 310. In one example of this process, each ballot is multiplied by its weight, then all the ballots are scored together 360. The ballot 1-1 (301-311) was weighted 370 a percentage of the total, in this example 40%. The ballot 1-2 (301-312) for beneficiary 2 (312) and beneficiary 3 (313) may be weighted a percentage of the total or in this case 30%. Each point total is multiplied by the weight to determine a final weighted score 360 for each beneficiary option 320. The option 320 with the highest weighted score 360 is selected as the most robust option 320 among the options 321, 322 and 323. The beneficiaries 310 cannot unilaterally change their preferences to switch to a more preferred option 320. Beneficiary one's 311 weight is 40%, so each of his scores is multiplied by 0.4. Thus, instead of his most preferred option receiving 3 points his most preferred option instead receives 0.4 times 3 points or 1.2 points. 1.2 points is equivalent to 12/10, as each option is represented as a fraction out of 10. These lead to new scores of 8/10 for option 1, 12/10 for option 2 and 4/10 for option 3. This process is then repeated for the second beneficiary 312, with a 30% weight. Each of his scores are multiplied by 0.3. Finally, this is repeated for the final beneficiary who also has a 30% weight and as such has each of his Borda scores multiplied by 0.3. The total of all of these weights is 100%. When all three weighted ballots are added together, option 2 is found to be the winner in the digital election. Note that this result is robust. No beneficiary 310 can change the order of his or her preferences to get a more preferred option 320 to win the election. This robustness check 160 is an important check that occurs throughout the polling process.

FIG. 5 shows an example for an election for a state 300 that was not polled. In this example, state 4 (304) was not one of the surveyed states from FIG. 3. As such, we do not have ballots for state 4 (304). However, there are ballots for states 1 (301) and 2 (302) and it happens to be the case that state 4 (304) is similar to states 1 and 2. The information from states 1 and 2 are used to predict what beneficiary 1's ballot might look like for state 4. In this example, there are two ballots that may be similar to state 1 (301) and state 2 (302). The system has not been provided certain beneficiaries' 310 preference 370 for the state 4 (304). The system selects two ballots 330 that most likely represent the preferences 370 of beneficiary 310 based on the preferences in similar states 300. The Bayesian analytics (3150) is utilized to determine which ballot 330 for states 300 are most similar to unknown state 4 (304). New ballots 4-1-A and 4-1-B are created 401 and 402. The two new ballots 401 and 402 are combined into a weighted ballot 410.

A full election would be repeated for the non-selected beneficiary 310, such as for beneficiary 312 and 313 with each beneficiary's 310 weighted ballot being weighted again based on the process shown in FIG. 4 for the weighted master ballot 390. This is similar in naming convention except the A and B now denote theoretical polled results. In this invention, the more likely a theoretical ballot is to resemble the actual ballot the higher weight it is given. In this example, theoretical ballot A is considered to be more plausible than theoretical ballot B, and as such A is weighted 60% and B is weighted 40%. This is based on a Bayesian computation based on the relationship between states 1, 2, and 4. Each theoretical ballot's Borda count is multiplied by its weight, and then the theoretical ballots are summed together. Ballot A has a weight of 60%, so each Borda count is multiplied by 0.6. Ballot B has a theoretical weight of 40%, so each Borda count is multiplied by 0.4 then added to the weighted scores from ballot A. The result is a weighted ballot, called 4-1, that is based off 4-1-A and 4-1-B. This weighted ballot shows option 2 has a new score of 2.6, option 1 has a score of 2.4 and option 3 has a score of 1. Note that even though these scores are not integers they still add up to the same total score as before. Ballots 4-1-A, 4-1-B, and 4-1 all have total scores of 6. In order to complete the digital election, this process would then be repeated for beneficiaries 2 and 3, and their ballots would be combined the same way as in FIG. 4 to determine a winner. Once a winner is determined, the election will be analyzed for robustness to see if the result is robust or if the beneficiaries should be polled for this new state, as seen in the process shown in FIG. 1.

A general recap of the system follows. The process will either run the initial step of identifying the current state of the system and re-run the analysis when it needs to be recalibrated. Alternatively, the system will return to the step of ranking the options to determine if the results are robust. See FIG. 1 for a flowchart of the process.

In step 120, data analytics and machine learning are used to analyze the current state of a system. This involves making estimates about the current value of parameters and collecting both qualitative and quantitative information.

Step 120 uses both this quantitative and qualitative information to make predictions about the future state of the process. This process starts by using the qualitative and quantitative information to estimate the likelihood of transitioning from one state to another state. These are known as transition probabilities. The analytical approach then uses these transition probabilities in Markov Chains to structure an analytical model for the way the process may develop over time. The Markov Chains are then analyzed using data analytics and machine learning to determine what the most important states are based on the similarity between states and the likelihood of transitioning between states. States that have a very high likelihood of occurring (via a high transition probability) and states that are structurally very different from other states are marked as more important states. FIGS. 2A and 2B also provide an overview of the methods used in step 120.

In step 130, the beneficiaries are asked about their preferences over outcomes in the most important states determined from the analysis in step 120. The purpose of a digitized virtual voting system is to mimic the results of a real voting system. As such, the beneficiaries are not asked about every state but rather only the states flagged as most important. This allows the process to collect the most important information from beneficiaries in a practical manner. The combination of Markovian analysis, Bayesian analysis, and artificial intelligence allows for extrapolation from this information to create a digitized system that allows us to "poll" our beneficiaries in all these different states.

The digital polling process occurs in step 140. In this process, the preferences of the beneficiaries are predicted for various states based on the data gathered in step 130. After this is done, the preferences are passed through a voting system, such as a Borda count. In the Borda count, the voter ranks his or her preferences in order, and the higher rated preferences receive more points. For example, for a choice between a number of options, if 3 options are selected, the highest rated option gets a score of 3, the next preferred option a score of 2 and the least preferred a score of 1. These scores are then added together over all voters and the highest scoring vote wins. In this proposed invention, this process is weighted using two different factors. The first weight is given to the importance of the beneficiary. In the example of a trust, beneficiaries with a higher percentage of ownership of the assets receive proportionally higher weights. For example, if individual A has a 20% ownership of assets in a trust and individual B has a 10% ownership, then A's votes are worth twice as much. The second weighting is based on uncertainty regarding an individual's votes. For each beneficiary, we predict what we believe his or her vote order would be. As a simple example, consider individual A has to choose between choices X and Y. If we believe individual A has a 30% chance of preferring X and a 70% chance of preferring Y, we would assign 30% of A's votes to X and 70% of A's votes to Y. In other words, each vote is weighted based on that beneficiary's weighted importance in the decision-making process, and that individual has multiple theoretical votes that are weighted together to have a total weight of 1, or 100%. This process can involve both theoretical ballots based on statistical predictions and can be structured to use simulations to create theoretical elections and simulated votes. Once all the votes are weighted and tallied, the scores are summed and the decision that receives the most weighted scored votes is selected. For an example of how this digitized voting system would work on states that have been surveyed, see FIG. 4.

It is possible that situations could arise that are different from those predicted by the Markovian analytical model. These states are explored in step 150. If one of these states arise, voter preferences are predicted using Bayesian analysis. Bayesian methods allow us to predict based on qualitative beliefs and quantitative information what an individual's preferences may most likely be in these states. This allows the modeling process to make predictions, and the vote tallying process from step 140 can be used based on Bayesian belief predictions. An example of how the Bayesian process works on states where beneficiaries have not been surveyed is shown in FIG. 5.

In step 160, the robustness of the results of step 150 are analyzed. This involves varying the assumptions slightly and adjust parameters to see if results are consistent. This is a way of testing how sensitive the results are to these deviations. If the results are robust, it means that even though some extrapolation is needed to draw conclusions that these conclusions appear empirically valid and that one can have a high degree of statistical confidence in the accuracy of the results. If the results are robust, then the vote tallying method from step 4 can be used and the decision can be accepted as a reasonable conclusion. This decision is then maintained until a new situation arises that requires extrapolation, in which case the process proceeds to step 5 as seen in FIG. 1.

If the results from step 170 are not robust and are sensitive to changes in assumptions, then this means additional information is needed about the preferences of the beneficiaries. This involves repeating the process again, starting at step 110. The new initial state of the process is the current state of the system. Once again, the process is repeated, proceeding to step 120 and using machine learning, data analytics and or statistics to analyze the process and polling the participants in step 130. The process then continues on to the decision-making process in step 140.

The end result of this process is a decision which tells us how to proceed based on the needs and beliefs of the beneficiaries. This invention is a novel approach that allows for many of the benefits of a democratized voter system with a more feasible application than polling all the beneficiaries every time a change occurs. As such, this provides many of the benefits of a democratized system without the cost and time constraints that normally are associated with such a process.

Although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiment disclosed, but will include all embodiments falling within the scope of the appended claims.

The invention claimed is:

1. A non-transitory computer-readable medium having instructions stored thereon which when executed by a processor cause the processor to perform steps comprising:
   storing data from a beneficiary in a system regarding a plurality of preference options for a digital election process for a state wherein the system includes a system set of current state preference options identifying a current state of the system;
   presenting the system set of current state preference options to the beneficiary wherein the beneficiary ranks the system set of current state preference options in the system to create a beneficiary selected plurality of preference options for the digital election process in order of preference by conducting a Borda count on the beneficiary selected plurality of preference options to generate a weighted score based on the rank of the beneficiary selected plurality of preference options;
   conducting a digital election process for a current state of the system using the weighted score based on the rank of the beneficiary selected plurality of preference options;
   identify a transition state of the system through analysis of the system set of current state preference options and the weighted score based on the rank of the beneficiary selected plurality of preference options;
   using a Markov Chain structure on the transition state of the system to determine the probability of transitioning from the current state of the system to a future state of the system by weighing the beneficiary selected plurality of preference options to form a transition probability;
   utilizing machine learning and data analytics to analyze the Markov Chain structure of the transition probability to determine the future state of the system and preparing a revised plurality of preference options based on the determination of the future state, wherein the machine learning and data analytics estimate a value of the future state utilizing both qualitative and quantitative information;
   presenting an inquiry to the beneficiary regarding the revised plurality of preference options in the current state of the system, and preferences for the most important options in the future state of the system and storing of the data;
   ranking the beneficiary selected plurality of preference options in the current state and options in a possible future state;
   deriving an optimal state based upon the beneficiary selected plurality of preferences for options in the current state and the revised plurality of preference options in the possible future state;
   determining when a new state arises that is a possible future state and when a possible future state arises, utilizing Bayesian techniques to predict the preferences of a beneficiary based upon the weighted score based on the rank of the beneficiary selected plurality of preference options of the beneficiary;

testing the robustness of the optimal state; and returning to the step of identifying the current state of the system when the optimal state is not robust.

2. The non-transitory computer-readable medium as defined in claim 1, wherein the step of utilizing machine learning further includes using statistics to determine a future possible state.

3. The non-transitory computer-readable medium as defined in claim 2, further comprising the step of determining the transition probability of the initial state to determine a plurality of transition states and a plurality of transition probabilities.

4. The non-transitory computer-readable medium of claim 3, further comprising the step of summarizing the transition probability and transition states in a Markov chain.

5. The non-transitory computer-readable medium of claim 4, further comprising the step of creating a plurality of Markov chains.

6. The non-transitory computer-readable medium of claim 5, further comprising the step of using data analytics and machine learning to test the robustness of the plurality of Markov chains.

* * * * *